United States Patent

[11] 3,578,853

[72] Inventors Johann Roth
Schwabhausen;
Alfred Roppel, Munich; Theodor Steibl,
Maisach, Germany
[21] Appl. No. 779,051
[22] Filed Nov. 26, 1968
[45] Patented May 18, 1971
[73] Assignee Niezoldi ½ Kramer GmbH
Munich, Germany

[54] MOTION PICTURE CAMERA
19 Claims, 1 Drawing Fig.

[52] U.S. Cl. ............................................ 352/91,
352/141
[51] Int. Cl. ............................................ G03b 7/14,
G03b 21/36
[50] Field of Search ........................................ 352/91,
141, 217, 208

[56] References Cited
UNITED STATES PATENTS

| | | | |
|---|---|---|---|
| 2,065,777 | 12/1936 | Weissbrodt | 352/217 |
| 3,116,659 | 1/1964 | Waroux | 352/141 |
| 3,124,033 | 3/1964 | Freudenschuss | 352/141 |
| 3,246,944 | 4/1966 | Winkler | 352/91 |
| 3,436,147 | 4/1969 | French | 352/141 |
| 3,438,701 | 4/1969 | Saraber | 352/141 |
| 3,444,798 | 5/1969 | Mayr et al. | 352/141X |

*Primary Examiner*—Louis R. Prince
*Assistant Examiner*—Harry C. Post, III
*Attorney*—Michael S. Striker

ABSTRACT: A motion picture camera with an adjustable rotary shutter and a diaphragm which is adjustable as a function of scene brightness. A lever is pivotable about a fixed axis to adjust the shutter and is movable radially of the axis to adjust the diaphragm independently of scene brightness as a function of the corresponding adjustment of the shutter.

PATENTED MAY 18 1971
3,578,853
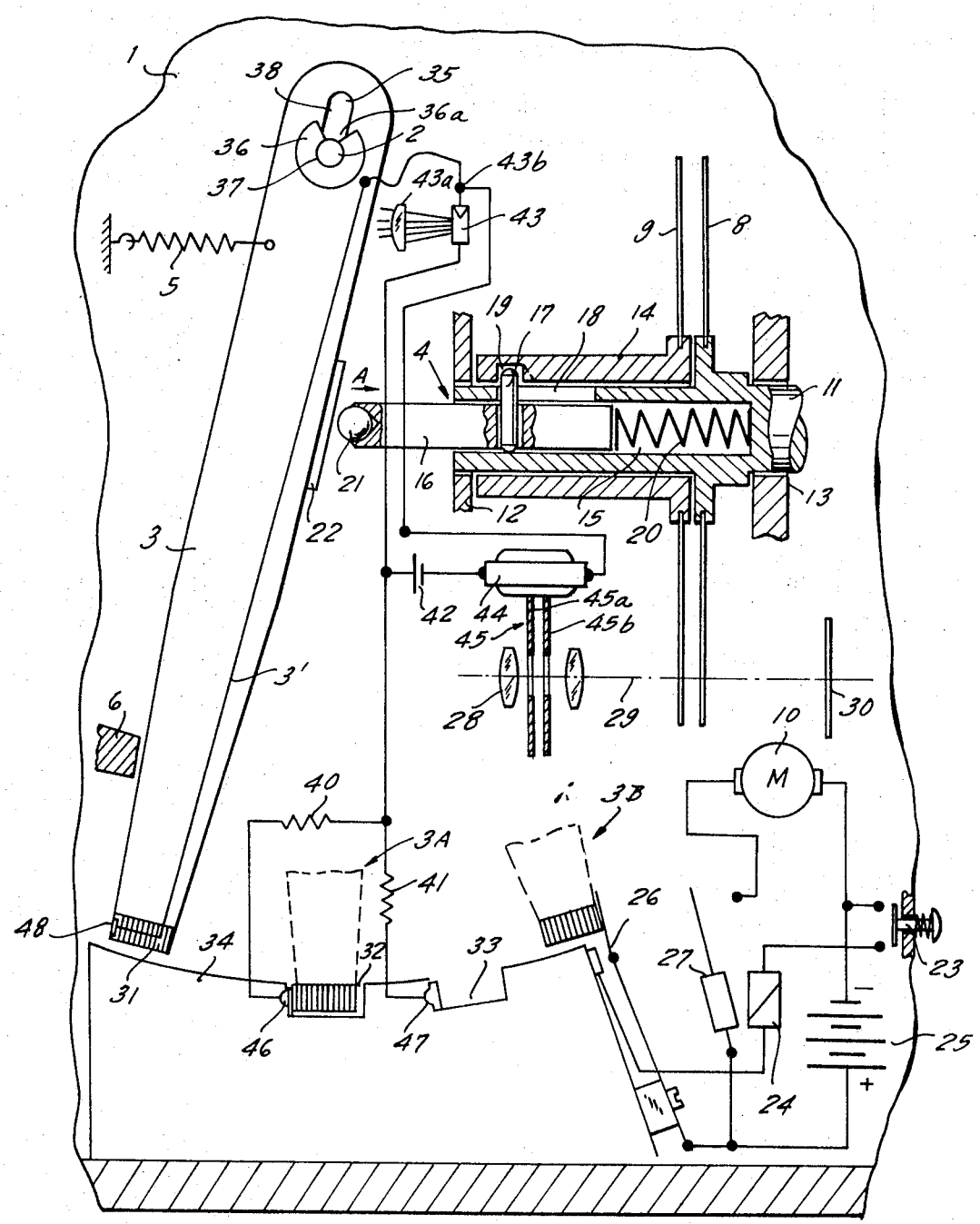
INVENTORS
JOHANN ROTH
ALFRED ROPPEL
THEODOR STEIBL
BY
their ATTORNEY

MOTION PICTURE CAMERA

BACKGROUND OF THE INVENTION

The present invention relates to photographic apparatus in general, and more particularly to improvements in motion picture cameras. Still more particularly, the invention relates to improvements in motion picture cameras of the type comprising an adjustable rotary shutter and a diaphragm which can change the aperture size as a function of changes in scene brightness.

It is already known to provide a motion picture camera with a rotary shutter which is adjustable to furnish one of several exposure times. As a rule, the shutter comprises two blades which define a light-transmitting opening. One of the blades is movable angularly with reference to the other blade to thereby change the area of the light-transmitting opening with attendant changes in exposure time. When the shutter rotates at a given speed, e.g., at 18 revolutions per second, the dimensions of the opening (as considered in the circumferential direction of the shutter axis) will determine the length of the interval during which the shutter permits passage of light while the shutter completes a full revolution. Adjustable shutters are desirable features of motion picture cameras because the user is in a position to make satisfactory exposures of rapidly moving objects by shortening the exposure time. This is of particular importance when the subject moves at right angles to the optical axis. However, a shortening of exposure time necessitates an appropriate adjustment of the aperture size. This is a problem to many amateur photographers. Adjustments of exposure time must be commensurate with adjustments of the diaphragm in order to insure that the combination of shorter or longer exposure time and the selected aperture size is satisfactory for making exposures at a given scene brightness.

It is also desirable to provide a motion picture camera with fading means which enables the user to produce well-known fade-in or fadeout effects. This involves gradual opening or closing of the diaphragm or a gradual change in exposure time from longest exposure time to zero exposure time or vice versa. If the camera is provided with film rewinding means, the fading means may be designed to produce fade-in or fadeout effects as well as double exposure of one or more film frames so that the images of a next-following scene are superimposed upon the images of the preceding scene. Such special effects are normally produced to indicate lengthy intervals between the filming of successive scenes or substantial changes in distance at which two successive scenes are filmed.

Attempts to construct a motion picture camera wherein changes in exposure time automatically entail appropriate changes in aperture size include the provision of a first adjusting mechanism which changes the exposure time by changing the angular position of one shutter blade with reference to the other shutter blade, and a second adjusting mechanism whose operation is synchronized with that of the first mechanism and which serves to adjust the diaphragm in response to changes in exposure time, or vice versa. Such cameras are quite expensive and prone to malfunction, and the two adjusting mechanisms take up much room which is at a premium in a compact motion picture camera for amateurs. As a rule, the second mechanism adjusts an auxiliary diaphragm which is placed in front of the photosensitive element in the circuit of the main diaphragm so that the amount of scene light which can reach the photosensitive element is changed as a function of changes in exposure time. Another drawback of such cameras is that they must be provided with complicated blocking devices which prevent adjustment of the diaphragm when the user wishes to change the exposure time independently of the aperture size or vice versa. It was found that the just described cameras are much too expensive because the provision of separate adjusting mechanisms and blocking devices increases the cost well beyond that which is warranted for the production of medium-priced or low-priced motion picture cameras for amateur photographers.

SUMMARY OF THE INVENTION

It is an object of our invention to provide a simple, inexpensive and compact motion picture camera which enables the user to produce a variety of special effects and which also enables the user to bring about automatic changes in exposure time in response to changes in aperture size or vice versa.

Another object of the invention is to provide a motion picture camera wherein the manipulation of a single adjusting member suffices to effect appropriate changes in exposure time in response to changes in aperture size or vice versa.

A further object of the invention is to provide a motion picture camera wherein the combination of selected aperture size and corresponding exposure time is best suited for making exposures at a given scene brightness.

An additional object of the invention is to provide a camera which embodies the above outlined features and wherein the means for effecting adjustments of exposure time and aperture size occupies little room and comprises a small number of simple parts.

Still another object of the invention is to provide a camera wherein the means which effects automatic adjustments in aperture size in response to changes in exposure time can also serve as a device which is manipulated to make trick shots, particularly fade-in or fadeout effects.

The improved motion picture camera comprises first adjustable exposure setting means (preferably a diaphragm which changes the aperture size as a function of changes in scene brightness) arranges to furnish a range of aperture sizes, second adjustable setting means (preferably comprising a rotary shutter wherein one of the blades is movable angularly with reference to the other blade to thereby change the effective area of the light-transmitting opening) arranged to furnish a range of exposure times, and adjusting means movable between a plurality of first positions in each of which the adjusting means adjusts one of the setting means (preferably the second adjusting means) to furnish a different exposure value (i.e., a different exposure time). The adjusting means is also movable to a second position from at least one of its first positions to thereby adjust the other setting means (preferably the diaphragm) as a function of the adjustment of the one setting means in the one first position of the adjusting means. Thus, by the simple expedient of moving the adjusting means from one or more predetermined first positions to the corresponding second position, the adjusting means can influence the diaphragm or the shutter so that the thus selected aperture size or exposure time is a function of the corresponding exposure time or aperture size. The adjusting means may comprise a lever which is pivotable about a fixed axis to move between its first positions and which is movable radially of such axis to move to one or more second positions in one or more predetermined angular positions.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

FIGURE DESCRIPTION OF THE DRAWING

The single FIG. is a schematic fragmentary sectional view of a motion picture camera which embodies one form of the invention.

DESCRIPTION OF THE PREFERRED EMBODIMENT

The drawing shows a portion of a motion picture camera which comprises a housing or body 1 provided with a pivot pin 2 for an adjusting lever 3 which can adjust two exposure value setting means, namely, an adjustable rotary shutter 4 and an adjustable diaphragm 45. The starting position of the adjusting lever 3 is indicated by solid lines; in such starting position, the lever is disengaged from the shutter 4 and the latter is thereby adjusted to furnish an exposure time of maximum duration, for example, one-fortieth second. A biasing means 5, here shown as a helical return spring, operates between the housing 1 and lever 3 to maintain the latter in starting position whereby the lever abuts against a fixed stop 6.

The shutter 4 comprises two blades 8 and 9 which are rotatable about a common axis and one of which (namely, the blade 9) can be turned with reference to the other blade (8) to thereby select another one of a range of exposure times. The blade 8 is fixedly secured to a shaft 11 which is driven by an electric motor 10. This motor is preferably designed to operate at several speeds in a manner not forming part of the present invention. The shaft 11 rotates in two walls 12, 13 which form part of or are installed in the housing 1. The shutter blade 9 is mounted on an annular member 14 (hereinafter called sleeve for short) which is rotatable on the shaft 11 and is coupled therewith in such a way that it can share all angular movements of the shaft 11 but is also turnable with reference thereto. The coupling comprises a radial motion transmitting pin 17 which extends through and outwardly beyond and axially parallel slot 18 of the shaft 11 and into an internal helical groove 19 provided in the sleeve 14. The pin 17 is mounted in a plunger 16 which is reciprocable in a blind bore 15 of the shaft 11 and is biased toward the adjusting lever 3 by a helical spring 20. The latter bears against the right-hand end face of the plunger 16 and reacts against the surface at the inner end of the blind bore 15. When the plunger 16 is caused to move axially under or against the bias of the spring 20, the pin 17 moves along the axially parallel slot 18 in the shaft 11 and causes the sleeve 14 to change its angular position with reference to the shaft to thereby change the size of the light-transmitting opening defined by the shutter blade 8, 9. The exposed end of the plunger 16 has a socket for a spherical motion transmitting member 21 which can be engaged by a plate 22 on the adjusting lever 3. Thus, when the lever 3 is pivoted in a counterclockwise direction, as viewed in the drawing, its plate 22 bears against the spherical element 21 and changes the axial position of the plunger 16 to thereby select one of several exposure times by changing the area of the light-transmitting opening between the shutter blades 8, 9. As stated before, the starting position of the adjusting lever 3 corresponds to the longest exposure time, for example, one-fortieth second at a frequency of 18 film frames per second.

The circuit of the electric motor 10 can be completed by closing a master switch or starter switch 23. This switch causes energization of a relay 24 which is in series with a normally closed limit switch 26 and a battery 25 or an analogous energy source. When the operator closes the master switch 23, the circuit of the relay 24 is completed from the positive pole of the energy source 25, through the closed limit switch 26, winding of the relay 24, master switch 23, and to the negative pole of the energy source. The thus energized relay 24 attracts its armature 27 whereby the latter completes the motor circuit from the positive pole of the energy source 25, through the armature 27, winding of the motor 10, and to the negative pole of the energy source.

Once the motor 10 is running to rotate the shaft 11 of the shutter blade 8, and the operator decides to pivot the adjusting lever 3 in a counterclockwise direction, the plate 22 of the lever 3 effects axial movement of the plunger 16 in a direction to compress the spring 20 whereby the shutter 4 furnishes progressively shorter exposure times until the lever 3 reaches its right-hand end position corresponding to zero exposure time, i.e., the area of the light-transmitting opening defined by the shutter blades 8, 9 for passage of light during each revolution of the shutter 4 is then reduced to zero. The direction of axial movement of the plunger 16 for the purpose of shortening the exposure time is indicated by arrow A. As shown in the drawing, the blades 8, 9 of the shutter 4 rotate in a plane which intersects the path of light 29 from an objective lens 28 to an unexposed film frame 30. When the adjusting lever 3 reaches its right-hand end position, it automatically opens the limit switch 26 so that the relay 24 is deenergized and its armature 27 opens the circuit of the motor 10 whereby the shaft 11 comes to a halt. In this way, the operator can produce a fadeout effect by gradually reducing the duration of exposure time from a maximum length to zero. In order to thereupon produce a fade-in effect, the operator pivots the adjusting lever 3 in a clockwise direction (while the master switch 23 remains closed) whereby the limit switch 26 closes as soon as the lever 3 leaves its right-hand end position and energizes the relay 24 which starts the motor 10. At the same time, the spring 20 which expands as the lever 3 moves back toward starting position causes the plunger 16 to change the angular position of the blade 9 with reference to the blade 8 so that the shutter 4 furnishes a series of exposure times of gradually increasing duration. The fade-in effect is completed when the lever 3 returns into abutment with the stop 6.

The adjusting lever 3 can also serve as a means for selecting any one of several intermediate exposure times and for thereupon maintaining the shutter 4 in a position in which the latter furnishes an exposure time of desired duration. The drawing illustrates a camera which can furnish three predetermined exposure times, namely, one-fortieth second when the lever 3 abuts against the stop 6, one-eightieth second when the lever registers with a first notch 32, and one one-hundred-sixtieth second when the lever registers with a second notch 33. The free end of the lever 3 is provided with a locking element 31 which can enter one of the notches 32, 33 to thereby arrest the lever in one of four different angular positions each of which corresponds to a different exposure time. The other three angular positions are the right-hand end position in which the lever 3 opens the limit switch 26 and the exposure time is zero, the starting position in which the lever 3 abuts against the stop 6, and the position of registry with the other notch. The notches 32, 33 can be provided in a panel 34 at the outer side of the housing 1 so that they can be readily detected by the operator, or the housing may be provided with a suitable scale to indicate those positions of the lever 3 in which the locking element 31 registers with the notch 32 or 33.

In accordance with a feature of our invention, the adjusting lever 3 also serves as a means for adjusting the diaphragm 45 as a function of selected exposure time. To this end, the lever 3 is movable radially of the pivot pin 2 to introduce its locking element 31 into the notch 32 or 33. In order to insure proper retention of the lever 3 during pivotal movement about the axis of the pin 2 as well as in each of its second positions, the lever is provided with an elongated slot 35 which extends radially of the pivot pin 2 and is wide enough to permit angular as well as radial movements of the lever. A detent element, here shown as an elastic split ring or washer 36, is fixed to the lever 3 and can expand in response to radial movement of the lever to permit entry of the pin 2 into the lowermost position 37 of the slot (this lowermost portion 37 registers with the central opening of the washer 36) or into the upper end portion 38 of the slot. The minimum width of the gap 36a between the two ends of the washer 36 (in unstressed condition of the washer) is less than the diameter of the pivot pin 2; therefore, the washer can yieldably hold the pin in the portion 37 or in the portion 38 of the slot 35. When the operator wishes to produce a fade-in or fadeout effect or to maintain the lever 3 in starting position, the pin 2 is received in the portion 37 of the slot 35. When the locking element 31 is moved into registry with the notch 32 or 33, the operator exerts upon the lever 3 a push or a pull (in downward direction, as viewed in the drawing) to move the pin 2 into the portion 38 of the slot 35 whereby the locking element 31 enters the notch 32 or 33 and remains in the selected notch until the lever 3 is forcibly moved radially of the pin 2 to return the latter into the portion 37 of the slot 35.

The diaphragm 45 is adjusted in response to movement of the locking element 31 into or away from the notch 32 or 33 in the following way: This diaphragm is adjustable as a function of scene brightness by way of a light meter 44 which is connected in series with a separate energy source 42 and with a photosensitive resistor 43 which is exposed to scene light. A lens 43a or the like is placed in front of the light-sensitive surface of the resistor 43. The manner in which the light meter 44 can move one vane 45a of the diaphragm 45 with reference to the other vane 45b (or both vanes with reference to each other) in response to a change in resistance of the resistor 43 is well known and need not be described here. The circuit of the light meter 44 further comprises two fixed resistors 40, 41 which are connected in parallel with the photosensitive resistor 43 when the locking element 31 of the adjusting lever 3 respectively enters the notches 32, 33. This influences the light meter 44 which then adjusts the diaphragm 45 as a function of scene brightness and as a function of the selected second position of the lever 3, i.e., as a function of the exposure time which corresponds to the respective angular position of the lever 3.

The adjusting lever 3 carries a conductor 3' which is connected with a tap 43b at one end of the photosensitive resistor 43 and carries a terminal 48 provided on the locking element 31. The notches 32, 33 respectively accommodate terminals 46, 47 in circuit with the fixed resistors 40, 41. When the lever 3 is moved to the second position 3A, its terminal 48 engages the terminal 46 and the fixed resistor 40 is connected in parallel with the photosensitive resistor 43. When the lever 3 assumes a third position in which it registers with the notch 33, its terminal 48 engages the terminal 47 in the notch 33 and the photosensitive resistor 43 is in parallel with the fixed resistor 41. The spring 5 performs the additional function of urging the terminal 48 against the terminal 46 or 47, depending upon whether the locking element 31 is received in the notch 32 or 33. The resistances of resistors 40, 41 are selected in such a way that the aperture size defined by the diaphragm 45 in the second and third positions of the lever 3 is a function of the corresponding exposure time (one-eightieth and one one-hundred-sixtieth second).

In order to reset the camera for normal operation, the user withdraws or expels the locking element 31 from the notch 32 or 33 whereby the spring 5 returns the lever 3 into abutment with the stop 6. The exposure time is then one-fortieth second and the aperture size in only a function of scene brightness, i.e., the fixed resistors 40, 41 are disconnected from the circuit of the light meter 44. In moving the locking element 31 from the notch 32 or 33, the operator must overcome the resistance of the detent means 36 because the pin 2 must be returned into the portion 37 of the slot 35.

The improved motion picture camera is susceptible of many modifications without departing from the spirit of our invention. For example, the adjusting lever 3 or an analogous adjusting member can carry the slider of a variable resistor which is connected in parallel with the photosensitive resistor 43 so that the diaphragm 45 is adjusted in automatic response to each angular displacement of the adjusting member as a function of the corresponding exposure time. The light meter 44 can be installed in a diagonal branch of a bridge circuit and the variable resistor is then installed in one arm of the bridge circuit so that variations in its resistance in response to pivotal movement of the adjusting member influence the light meter and, by way of this light meter, the setting of the diaphragm as a function of the corresponding exposure time.

It is further possible to provide a mechanical motion transmitting connection between the adjusting lever 3 and the light meter 44. For example, the mechanical connection can effect such adjustments of the diaphragm that the combined exposure value including the exposure time and the aperture size remains unchanged in response to changes in exposure time. The mechanical connection can rotate or it can effect translatory movements of the light meter. Also, such mechanical connection can change the bias of the spring which maintains the output member of the light meter in zero position, i.e., the connection can change the initial position of the output member. Still further, the adjusting lever 3 can be directly coupled with the diaphragm 45 or with an analogous diaphragm. For example, angular movements of the lever 3 about the axis of the pivot pin 2 can bring about adjustments in the position of the pivot of one diaphragm vane with reference to the pivot of the other diaphragm vane. Of course, it is also possible to provide a mask or a filter which is movable in front of the photoelectric resistor 43 to thereby influence the circuit of the light meter in response to movements of adjusting lever 3 in a direction to change the exposure time. Such a mask or filter then determines the amount of scene light which can reach the light-sensitive surface of the resistor 43. However, it was found that the operator of a camera wherein one, two or more but not all adjustments of the shutter result in appropriate adjustments of the diaphragm can make satisfactory exposures in all (or nearly all) situations in which a motion picture camera is normally used.

The aforedescribed different methods of adjusting the diaphragm in response to adjustment of the shutter can be employed in the illustrated camera with minimal changes in its design. Thus, instead of relying on the resistors 40 and 41, the camera may employ a mask or a filter which is moved in front of the photoelectric resistor 43 in response to movement of the locking element 31 into the notch 32 or 33 to thereby influence the setting of the diaphragm as a function of selected exposure time. In other words, the arrangement which effects adjustments of the diaphragm 45 or a similar diaphragm in selected first (angular) positions of the adjusting lever 3 may include mechanical, optical and/or electrical means. Electrical means are preferred at this time because they occupy little room which is of particular importance in compact motion picture cameras. The resistance of the resistor 41 is different from that of the resistor 40 and, when connected in parallel with the photosensitive resistor 43, the resistor 40 or 41 reduces the voltage at the terminals of the light meter 44 which is analogous to a reduced scene brightness so that the diaphragm 45 then defines an aperture of greater size. Of course, the resistances of the resistors 40, 41 are selected in such a way that the change in aperture size in response to movement of the locking element 31 into the notch 32 or 33 is a function of the corresponding exposure time, i.e., that the combined exposure value including the exposure time of one-eightieth or one one-hundred-sixtieth second and the corresponding aperture size at a given scene brightness remains unchanged. If the scene brightness changes while the locking element 31 extends into one of the notches 32, 33, the photosensitive resistor 43 automatically effects appropriate adjustment of the aperture size so that the combination of exposure time and aperture size is best suited for exposures at the changed scene brightness.

The camera is preferably provided with conventional indicating means which can warn the user that the intensity of scene light is too low or excessive for a satisfactory exposure. Such indicating means normally comprises a flag or a needle which is observable in the view finder or in a separate window and registers with a mark indicating unsatisfactory exposures when the scene light is too weak and/or when the aperture size is too small.

It is also possible to replace the adjusting lever 3 with a resilient adjusting member which must be deformed in order to move from starting position toward and beyond the position corresponding to that shown at 3A. Its innate resiliency then tends to maintain the adjusting member in starting position. Furthermore, the spring 5 can be replaced by a leaf spring or by other biasing means which can urge a rigid or an elastic adjusting member to starting position. The same holds true for the elastic detent means 36 which can be replaced by other detent means (for example, by one or more leaf springs) capable of urging the adjusting member to one of its first positions in which the adjusting member merely adjusts the shutter 4 or to a second position when the adjusting member reaches a selected first position. Of course, the adjusting member may be a slide which moves lengthwise or sideways to effect adjustments of the shutter 4 and sideways or lengthwise to adjust the diaphragm 45.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended:

I claim:

1. In a motion picture camera, a combination comprising first adjustable exposure value setting means arranged to furnish a range of aperture sizes as a function of scene brightness; second adjustable exposure value setting means arranged to furnish a range of exposure times; and adjusting means movable between a plurality of first positions in each of which said adjusting means adjusts only one of said setting means to furnish a different exposure value, said adjusting means being movable to a second position from at least one of said first positions thereof to thereby adjust only the other setting means as a function of the adjustment of said one setting means in said one first position of the adjusting means.

2. A combination as defined in claim 1, wherein the direction of movement of said adjusting means to said second position is substantially normal to the direction of movement of said adjusting means between said first positions thereof.

3. A combination as defined in claim 1, wherein said one setting means is said second setting means.

4. A combination as defined in claim 3, wherein said adjusting means is movable to said second position from at least one first position which corresponds to a predetermined exposure time.

5. A combination as defined in claim 3, wherein said one setting means is a rotary shutter including a pair of blades defining between themselves a light-transmitting opening and wherein one of said blades is movable with reference to the other blade to change the area of said opening and to thus change the exposure time, said adjusting means being arranged to move said one blade with reference to said other blade in response to movement between said first positions thereof.

6. A combination as defined in claim 1, further comprising means for biasing said adjusting means to one of said first positions thereof.

7. A combination as defined in claim 1, wherein said adjusting means is movable to a second position in each of said first positions thereof.

8. A combination as defined in claim 1, further comprising detent means for yieldably holding said adjusting means for movement between said first positions thereof.

9. A combination as defined in claim 1, further comprising detent means for yieldably holding said adjusting means against movement from said second position thereof.

10. A combination as defined in claim 1, wherein said other setting means is said first setting means and comprises an adjustable diaphragm and electric means for adjusting said diaphragm in response to movement of said adjusting means to said second position.

11. A combination as defined in claim 10, wherein said electric means comprises a circuit and resistor means connectable into said circuit in response to movement of said adjusting means to said second position.

12. A combination as defined in claim 11, wherein said adjusting means is movable to a plurality of second positions and said electric means comprises a plurality of resistor means each having a different resistance and each connectable into said circuit in response to movement of said adjusting means to a different second position.

13. A combination as defined in claim 12, further comprising locating means for removably locating said adjusting means in each of said second positions thereof.

14. A combination as defined in claim 13, wherein said circuit comprises photosensitive means and wherein said adjusting means comprises terminal means for connecting the respective resistor means in parallel with said photosensitive means in the corresponding second positions thereof.

15. A combination as defined in claim 13, wherein said locating means comprises a member provided with a plurality of notches and said adjusting means comprises a locking portion which enters one of said notches in response to movement of said adjusting means to corresponding second position.

16. A combination as defined in claim 1, wherein said first positions include a starting position and an end position and wherein said one setting means is said second setting means, said adjusting means being arranged to reduce the exposure time from a longest exposure time to exposure time of zero length in response to movement from said starting position to said end position.

17. A combination as defined in claim 16, wherein said one setting means comprises rotary shutter means and further comprising drive means for said rotary shutter means and means for arresting said drive means in response to movement of said adjusting means to said end position.

18. A combination as defined in claim 17, wherein said drive means comprises electric motor means and said arresting means comprises normally closed limit switch means in the circuit of said motor means, said adjusting means being arranged to open said switch means in said end position thereof.

19. A combination as defined in claim 1, wherein said adjusting means comprises an adjusting member which is pivotable about a fixed axis to move between said first positions thereof and is arranged to move radially of said axis to assume or to leave said second position thereof.